United States Patent [19]

Kaku et al.

[11] Patent Number: 5,175,745
[45] Date of Patent: Dec. 29, 1992

[54] TRANSVERSAL TYPE AUTOMATIC EQUALIZER WITH TAP COEFFICIENT PROTECTION

[75] Inventors: Takashi Kaku, Tama; Hiroki Kishimoto, Kawasaki, both of Japan

[73] Assignee: Fujitsu Limited, Japan

[21] Appl. No.: 585,622

[22] Filed: Sep. 20, 1990

[30] Foreign Application Priority Data

Sep. 20, 1989 [JP] Japan .................................. 1-244852

[51] Int. Cl.$^5$ ............................................ H03H 7/30
[52] U.S. Cl. ...................................... 375/12; 333/18; 364/724.19
[58] Field of Search ........................ 375/12, 13, 15, 14; 328/162; 333/18; 364/724.19, 724.2

[56] References Cited

U.S. PATENT DOCUMENTS

| | | | |
|---|---|---|---|
| 4,097,807 | 6/1978 | Fujimura | 325/42 |
| 4,237,554 | 12/1980 | Gitlin et al. | 375/15 |
| 4,243,959 | 1/1981 | Duttweiler | 333/18 |
| 4,334,313 | 6/1982 | Gitlin et al. | 375/15 |
| 4,376,308 | 3/1983 | McNair | 375/14 |
| 4,384,355 | 5/1983 | Werner | 375/14 |

OTHER PUBLICATIONS

R. D. Gitlin et al., "The Tap-Leakage Algorithm: An Algorithm for the Stable Operation of a Digitally Implemented, Fractionally Spaced Adaptive Equalizer", The Bell System Technical Journal, vol. 61, No. 8, pp. 1817 to 1839.
R. D. Gitlin et al., "Fractionally-Spaced Equalization: An Improved Digital Transversal Equalizer", The Bell System Technical Journal, vol. 60, No. 2, pp. 275 to 296.

Primary Examiner—Stephen Chin
Attorney, Agent, or Firm—Staas & Halsey

[57] ABSTRACT

A system of the transversal type automatic equalizer with a tap coefficient protection in which an inter-symbol interference is prevented. The system includes a summing unit for summing all of the tap powers detected by tap power detecting unit, and a determination unit for comparing the sum produced by the summing unit with a predetermined threshold value, and for producing the output determination of normal when the sum is not more than the threshold value and producing the output determination of abnormal tap coefficient growth when the sum is more than the threshold value.

6 Claims, 8 Drawing Sheets

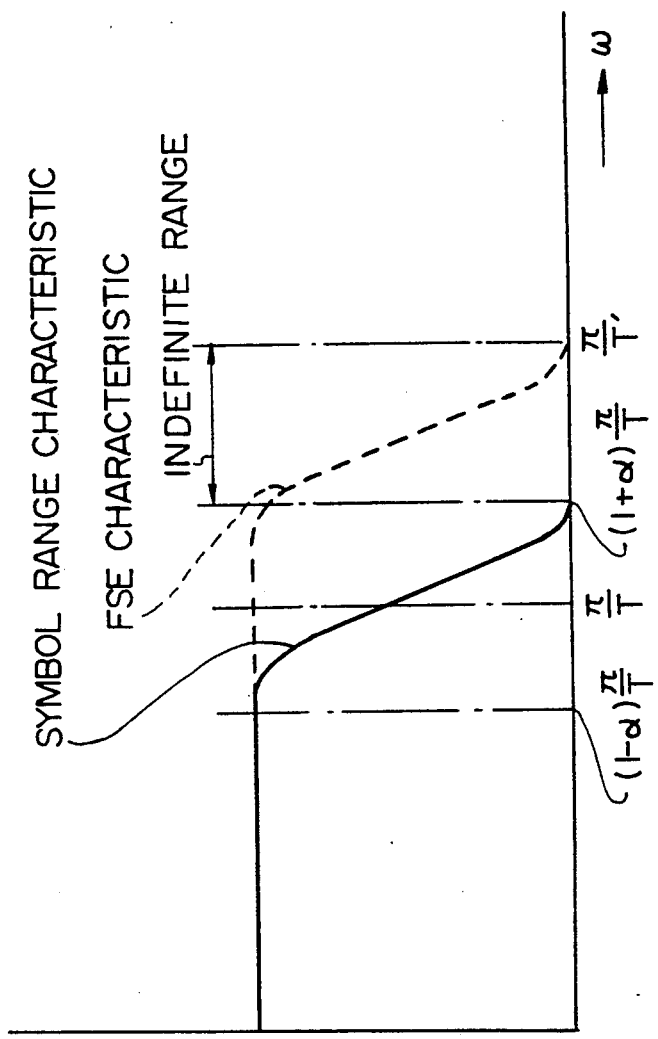

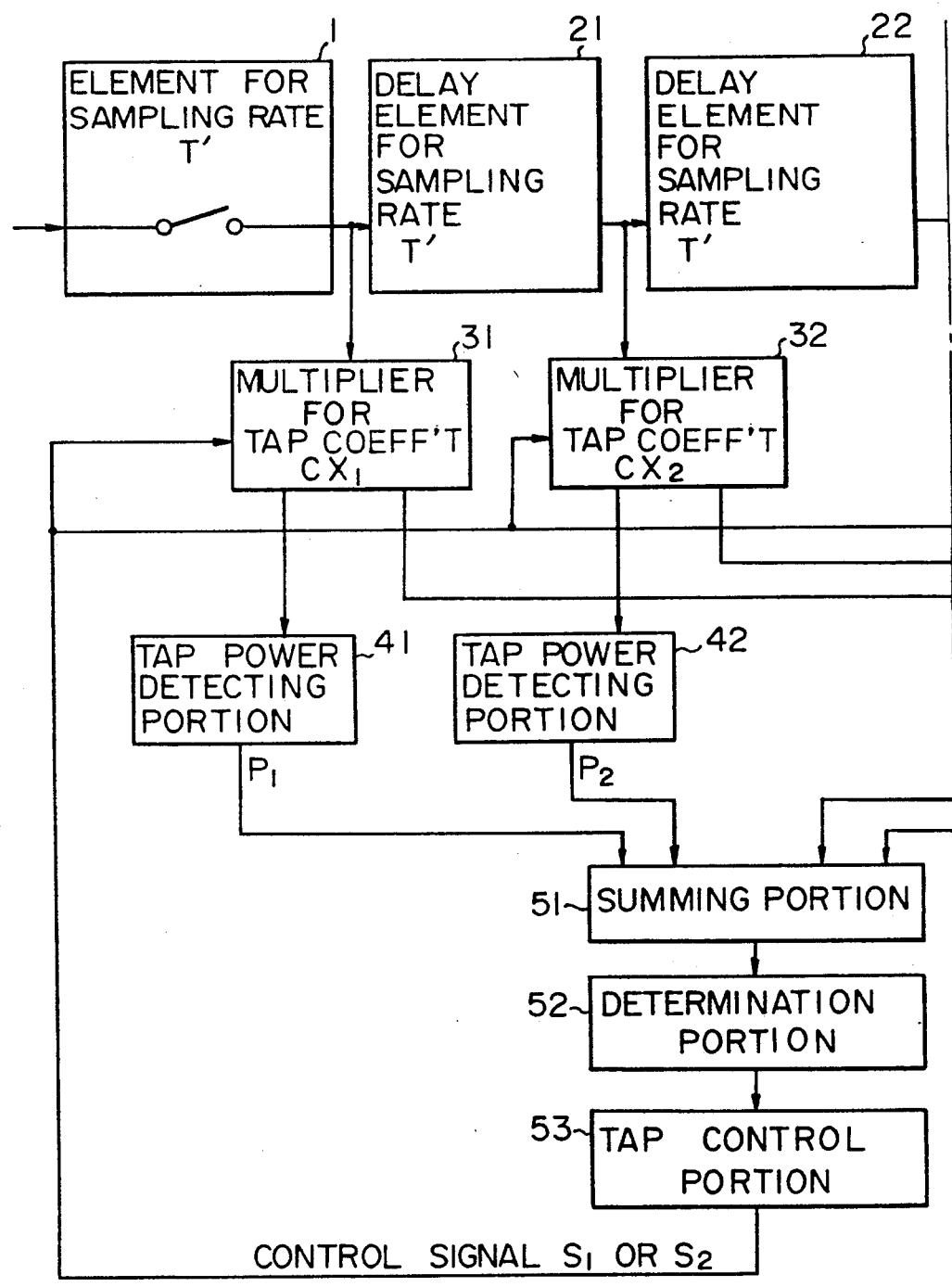

TRANSVERSAL TYPE AUTOMATIC EQUALIZER WITH TAP COEFFICIENT PROTECTION

BACKGROUND OF THE INVENTION

1. Field of the Invention

The present invention relates to a transversal type automatic equalizer system with tap coefficient protection. The system according to the invention is used for automatic equalization as one of various compensation techniques, for example, for digital signal communication in voice band frequency. The system according to the invention can be used not only for a fractionally tap spaced equalizer (FSE), but also for a usual transversal type automatic equalizer.

2. Description of the Related Arts

A system of a fractionally tap spaced equalizer (FSE) as one of the transversal type automatic equalizer systems has been known in which the sampling rate T' for defining the tap interval is set to be less than the symbol rate T defined by the reciprocal of twice the highest signal frequency. The fractionally tap spaced equalizer having the tap interval T' equal to half the symbol rate T (T'=T/2) is known as a double sampling equalizer.

In the case where the FSE is used in the receiving portion of a voice frequency range modem for the frequency range of about 0.3 to 3.4 KHz, the speed of the pull-in operation of the automatic equalizer in the receiving portion is high, since the operation does not depend on the sampling phase of the processing in the receiving portion.

In the FSE, however, it happens that the tap coefficients $C_{-N}$ to $C_N$ grow abnormally due to the indefinite range of the FSE, and the gain of the equalizer reaches the upper limit and accordingly an overflow is caused. This situation was reported, for example, in CH2114-7/85/0000-1667$1.00 C 1985, IEEE.

In the characteristic of the distribution of the spectrum of the FSE with respect to an ideal transmission pulse, the FSE has the range extended to $\pi/T'$ and an indefinite range where the symbol power is zero is formed between the extended FSE range and the symbol range.

In order to prevent the abnormal growth of the tap coefficient caused by the indefinite range of the FSE where the symbol power is zero, an attempt has been made, for example, to force an addition of a weak noise component which does not affect the signal-to-noise ratio to the indefinite range so that the power level in the indefinite range is not made to become zero. However, in this attempt, there is a problem that the signal-to-noise ratio of the signal in the system is deteriorated.

SUMMARY OF THE INVENTION

It is an object of the present invention to provide an improved system of the transversal type automatic equalizer with a tap coefficient protection in which the abnormal growth of the tap coefficient of the automatic equalizer is quickly detected, and the tap coefficient is controlled to suppress the abnormal growth of the tap coefficient when the abnormal growth is detected.

In accordance with the present invention, there is provided a system of a transversal type automatic equalizer with tap coefficient protection in which an inter-symbol interference is prevented including: a tap power detecting unit for detecting the tap power of each tap coefficient; a summing unit for summing all of the tap powers detected by the tap power detecting unit; and a determination unit for comparing the sum produced by the summing unit with a predetermined threshold value, and for producing the output of normal determination when the sum is not more than the threshold value and producing the output determination of abnormal tap coefficient growth when the sum is more than the threshold value.

BRIEF DESCRIPTION OF THE DRAWINGS

In the drawings,

FIG. 2 illustrates the distribution characteristics of the spectrum for the system of FIG. 1;

FIGS. 3A & 3B show a system of the transversal type automatic equalizer with tap coefficient protection according to an embodiment of the present invention;

DESCRIPTION OF THE PREFERRED EMBODIMENTS

Figure 1:
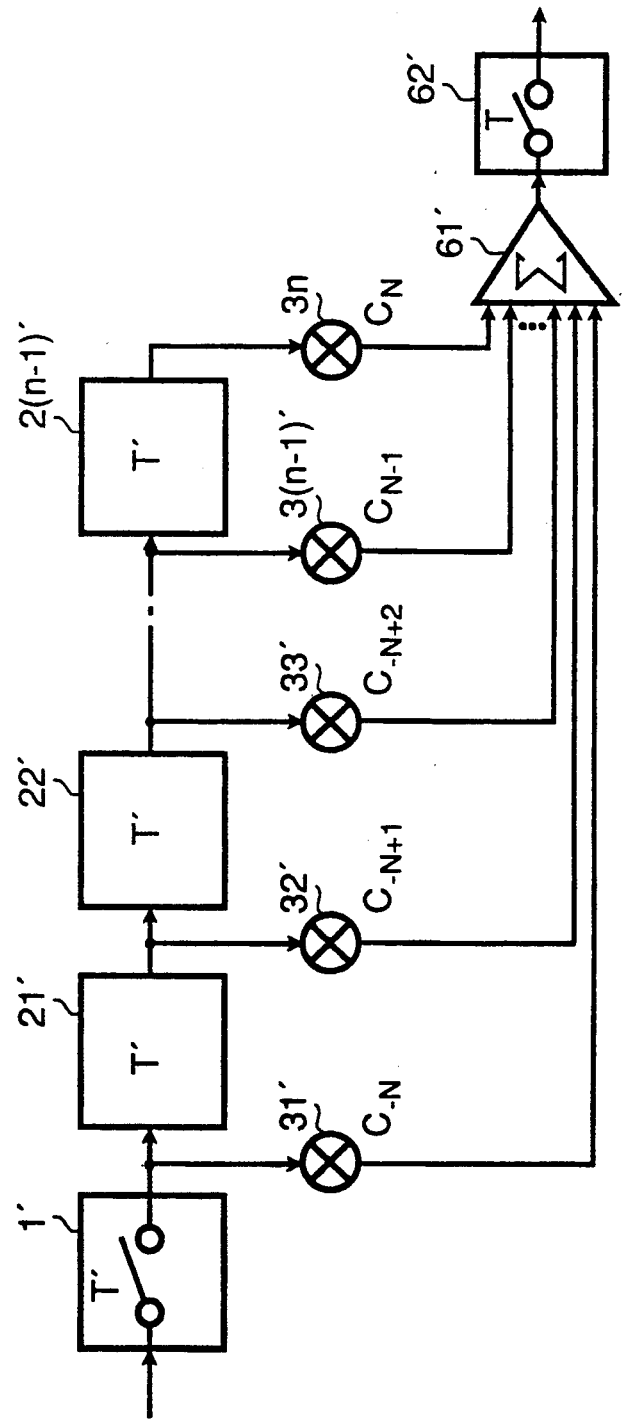
FIG. 1 shows a prior art system of the fractionally tap spaced equalizer of the transversal type.

Before describing the preferred embodiments of the present invention, a prior art system of the fractionally tap spaced equalizer (FSE) will be described below with reference to FIG. 1. The characteristic of the spectrum distribution of the FSE is illustrated in FIG. 2. The FSE of FIG. 1 is constituted by an element for sampling rate (T') 1', delay elements for sampling rate (T') 21', 22', ... 2(n−1)', multipliers for tap coefficients 31', 32', ... 3n', a summing element 61', and an element for symbol rate (T) 62'. The sampling rate T' for defining the tap interval is set to be less than the symbol rate T defined by the reciprocal of twice of the highest signal frequency.

In the case where the FSE system of FIG. 1 is used in the receiving portion of a voice range modem for the frequency range of about 0.3 to 3.4 KHz, the speed of the pull-in operation of the automatic equalizer in the receiving portion is high, since the operation does not depend on the sampling phase of the processing in the receiving portion.

In the characteristic illustrated in FIG. 2, the FSE has the range extended to $\pi/T'$ as shown by a broken line and an indefinite range where the symbol power is zero is formed between the extended FSE range shown by a broken line and the symbol range shown by a solid line.

Figure 3B:
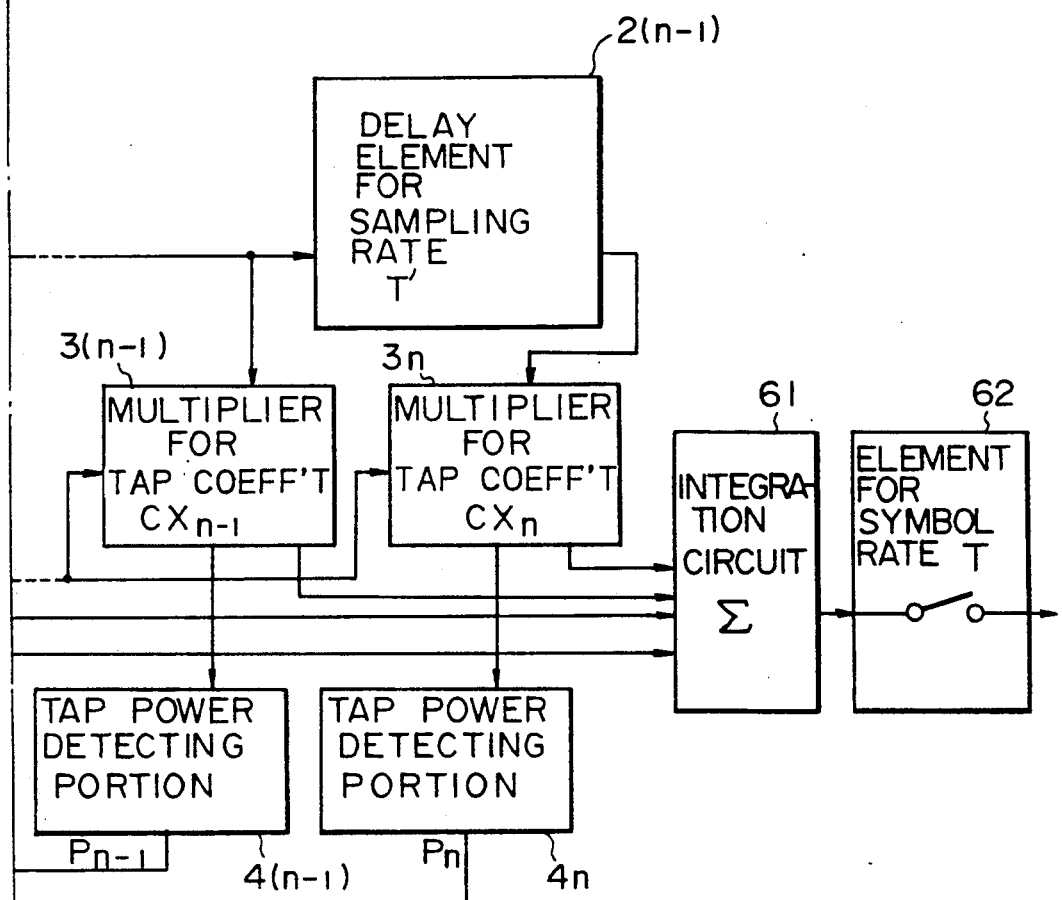

A system of the transversal type automatic equalizer with a tap coefficient protection according to an embodiment of the present invention is shown in FIG. 3.

The system of FIG. 3 includes a sampling rate (T') element 1, sampling rate (T') delay elements 21, 22, ... 2(n−1), multipliers for tap coefficient elements (CX$_1$, CX$_2$, ... CX$_n$) 31, 32, ... 3n, tap power detecting portions 41, 42, ... 4n, a summing portion 51, a determination portion 52, a tap control portion 53, an integration circuit 61, and a symbol rate (T) element 62. The automatic equalizer of FIG. 3 is an FSE having a small sampling rate T' which is a division of a symbol rate T.

The tap power detection portions 41, 42, ... 4n detect powers $P_1, P_2, \ldots P_n$ of tap coefficients $CX_1, CX_2, \ldots CX_n$. The summing portion 51 calculates the sum of the powers $P_1, P_2 \ldots P_n$. In the determination portion 52, the sum of the powers produced from the summing portion 51 is compared with a predetermined threshold value, and when the sum of the powers is not more than the threshold value, the normal determination output is delivered as the decision of absence of the abnormal growth of the tap coefficient, and, when the sum of the powers is more than the threshold value, the abnormal determination output is delivered as the decision of existence of abnormal growth of the tap coefficient.

For the threshold value in the determination portion 52, a usual gain of the automatic equalizer is adopted. In practice, the usual gain of 3 dB is adopted.

In the tap control portion 53, when the normal decision output is delivered from the determination portion 52, a control signal $S_i$ is supplied to the tap coefficient elements 31, 32, ... 3n to maintain the tap coefficients $CX_1, CX_2, \ldots CX_n$, and when the abnormal decision output is delivered from the determination portion 52, a control signal $S_2$ is supplied to the tap coefficient elements 31, 32, ... 3n to suppress the gain of the automatic equalizer by multiplying each of the tap coefficients $CX_1, CX_2, \ldots CX_n$ by a predetermined coefficient $\beta$ which is a little less than unity. Such a coefficient $\beta$ is able to maintain the deterioration amount of the S/N error rate to be less than 0.1 dB.

Figure 4:
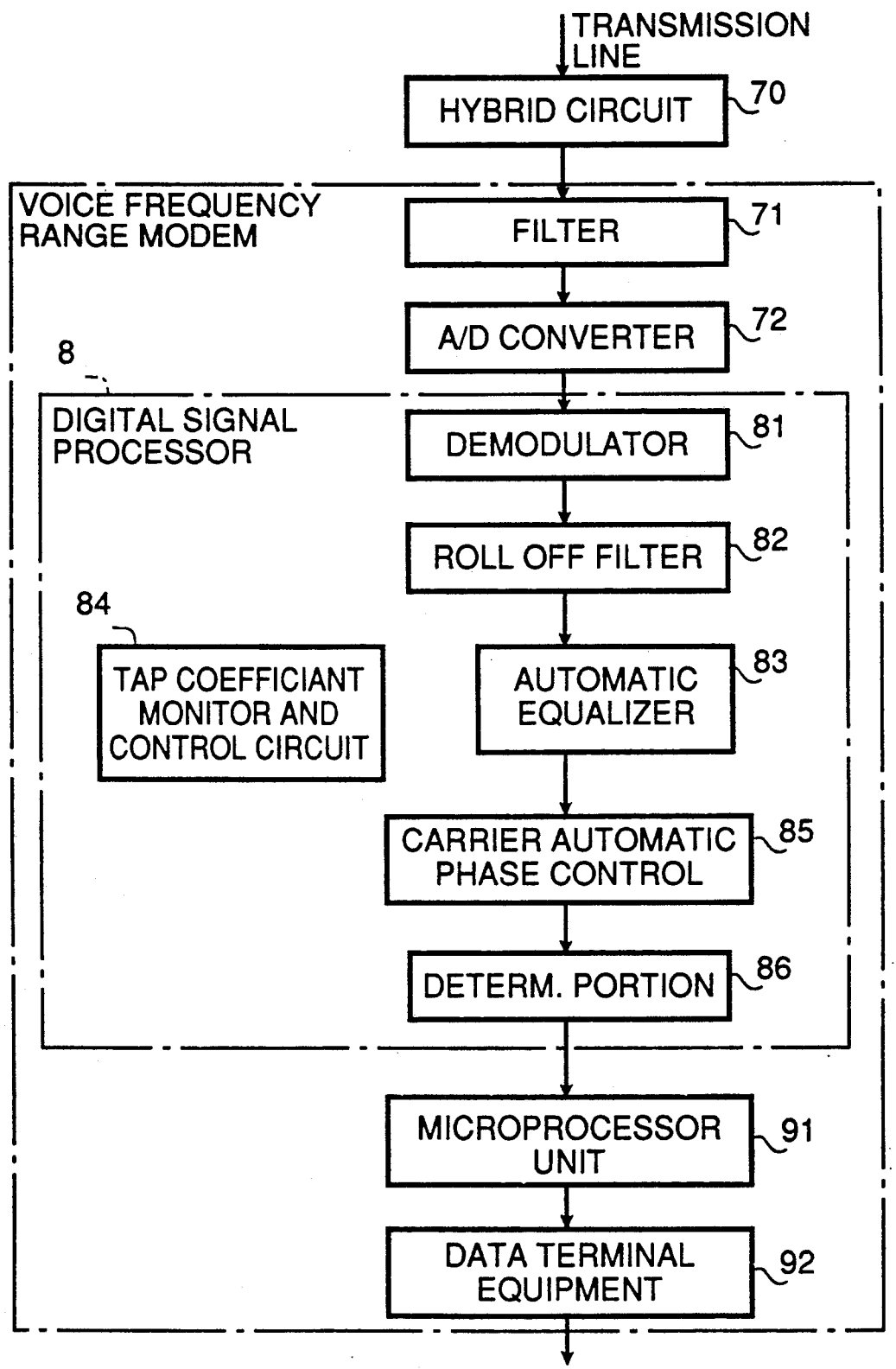
FIG. 4 shows the receiving portion of a voice frequency range modem to which the system of FIG. 3 is applicable.

The arrangement of the receiving portion of a voice frequency range modem to which the system of FIG. 3 is applicable is shown in FIG. 4. The arrangement of FIG. 4 includes a hybrid circuit 70, a filter 71, an A/D converter 72, a digital signal processor 8 having a demodulator 81, a roll off filter 82, an automatic equalizer 83, a tap coefficient monitor and control circuit 84, a carrier automatic phase control portion 85, and a determination portion 86, a microprocessor unit 91, and data terminal equipment 92.

The hybrid circuit 70 receives a signal through a transmission line such as an analog telephone transmission line of the frequency range 0.3 to 3.4 KHz. The digital data converted by the A/D converter 72 is supplied to the digital signal processor 8 operated according to a program control.

In the demodulator 81, a demodulation of the real part data R and the imaginary part data I which have been modulated in the transmitting side represent the coordinates of the signal point on the complex number plane by the synchronized detection of the received quadrature amplitude modulated (QAM) signal. In the roll off filter 82, the wide range cut characteristic of the receiving symbol range is provided, and the filter characteristic which is attenuated in a cosine wave manner with the angular frequency $\omega = \pi/T$ at the center thereof is provided.

In the automatic equalizer 83, the inter-code interference produced in the signal transmission through the transmission line is eliminated.

In the carrier automatic phase control circuit 85, the frequency offset and the phase error contained in the output from the automatic equalizer 83 are eliminated. For the carrier automatic phase control circuit 85, the technique of Japanese Examined Patent Publication (Kokoku) No. 55-33203 of Fujitsu Limited may be used.

In the determination portion 86, the error of the signal point supplied from the carrier automatic phase control circuit 85 is corrected and the correct signal point is decided. For this decision, a hard decision using a hardware-like data table, and a soft decision using the Viterbi decoding in which the correct signal point is demodulated according to the transition rule based on trellis coding by the redundant one bit addition for the transmitter side error control, are carried out.

In the microprocessor unit 91, a comparison between the coordinates of a signal point supplied from the determination portion 86 and a predetermined mapping pattern is carried out to demodulate the bit data corresponding to the signal point. The bit data demodulated based on the predetermined mapping pattern are arranged successively into a sequence of serial data. The arranged data sequence is delivered from the data terminal equipment 92.

In accordance with the system of FIG. 3 according to an embodiment of the present invention, in the voice frequency range modem of FIG. 4, the map coefficient monitor and control portion 84 are provided for constantly monitoring, the abnormal growth of the tap coefficient of the FSE as the automatic equalizer 83 and, upon deciding the abnormal growth, for controlling reduction of the tap coefficient.

Figure 5:
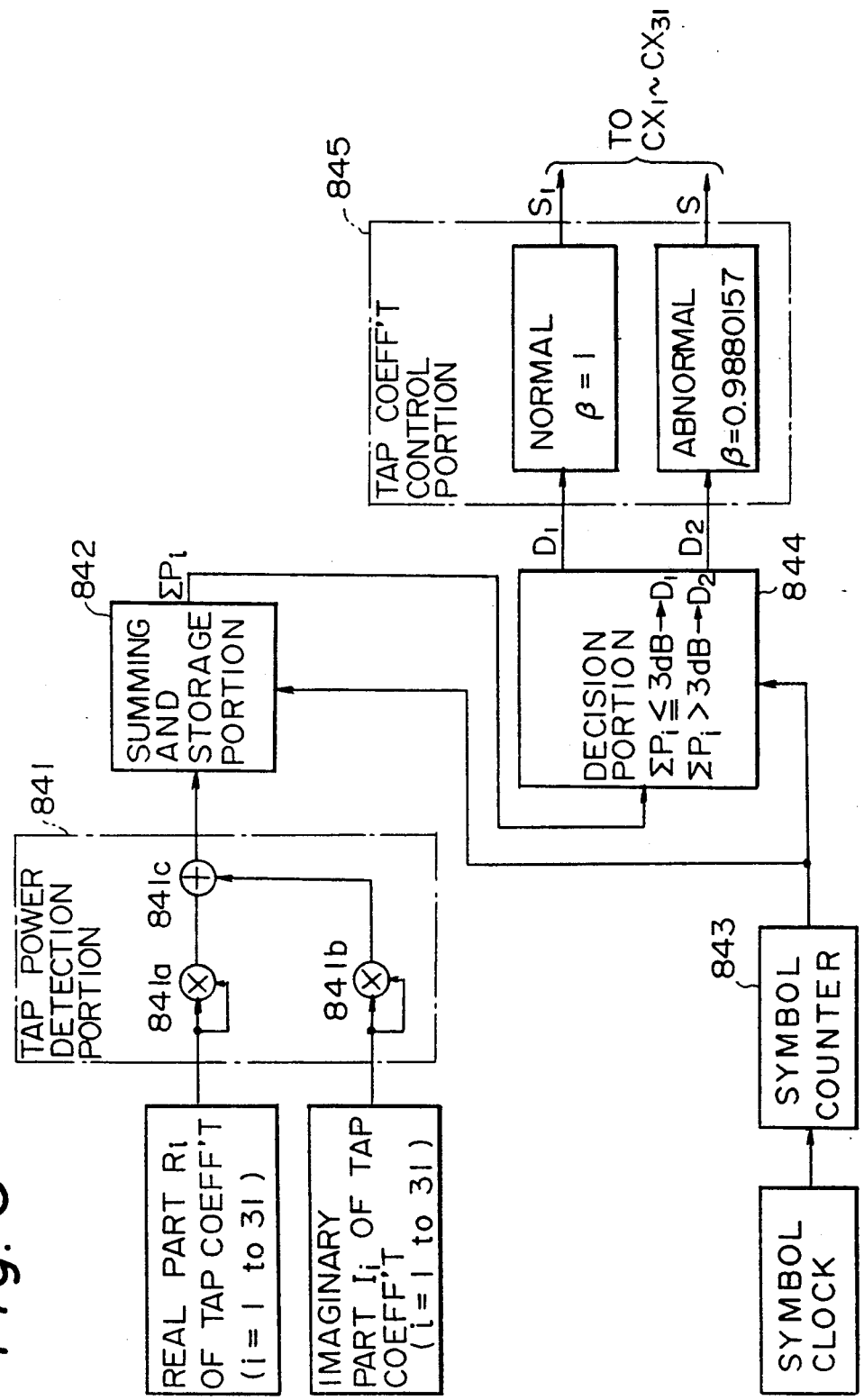
FIG. 5 shows the structure of the tap coefficient monitor and control circuit used in the system of FIG. 3.

An example of the structure of the tap coefficient monitor and control circuit 84 in FIG. 4 is shown in FIG. 5. The tap coefficient monitor and control circuit of FIG. 5 relates to an FSE having the tap number of 31.

The circuit of FIG. 5 includes a tap power detection portion 841 having multipliers 841a and 841b and an adder 841c, a summing and storage portion 842, a symbol counter 843, a decision portion 844, and a tap coefficient control portion 845. The square $R^2$ of the real part R of the tap coefficient is calculated by the multiplier 841a. The square $I^2$ of the imaginary part of the tap coefficient is calculated by the multiplier 841b. The tap power $P_i$ where $i=1$ to 31 expressed in the formula:

$$P_i = R_i^2 + I_i^2$$

is calculated by the adder 841c. In the tap power detection portion 841, the power of one tap is calculated for each received symbol. For the tap number of 31 of the FSE, the tap powers $P_1$ to $P_{31}$ for all of the tap numbers of 31 can be detected during the period of receiving of 31 symbols for $i=1$ to 31.

In the symbol counter 843, the received symbols are counted, and, when the all of the clocks for 31 symbols are counted, an output signal is delivered. After that, the counter 843 is cleared and the counting is repeated from the initial state.

In the summing and storage portion 842, the powers $P_1$ to $P_{31}$ calculated according to the above-mentioned formula for $P_i$ are successively summed and stored. When the output from the symbol counter 841 is received, the stored summed value is supplied to be decision portion 844.

In the decision portion 844, the sum $\Sigma P_i$ of the powers for all taps supplied from the summing and storage portion 842 is compared with the usual gain of the FSE, for example 3 dB, as the threshold value. When $\Sigma P_i$ is not more than 3 dB, the normal decision output $D_1$ for indicating the absence of abnormal growth is delivered, and when $\Sigma P_i$ is more than 3 dB, the abnormal decision output $D_2$ for indicating the abnormal growth is delivered.

In the tap coefficient control portion 845, when the normal decision output $D_1$ is supplied from the decision portion 844, a control signal $S_1$ is delivered to each of the coefficient elements $CX_1$ to $CX_{31}$ of the FSE to maintain each of the tap coefficients with the multiplication coefficient $\beta=1$, and when the abnormal decision output $D_2$ is supplied from the decision portion 844, a control signal $S_2$ is delivered to each of the coefficient elements $CX_1$ to $CX_{31}$ of the FSE to reduce each of the tap coefficients with the multiplication coefficient $\beta=0.9880157$ which is slightly less than unity.

Figure 6A:
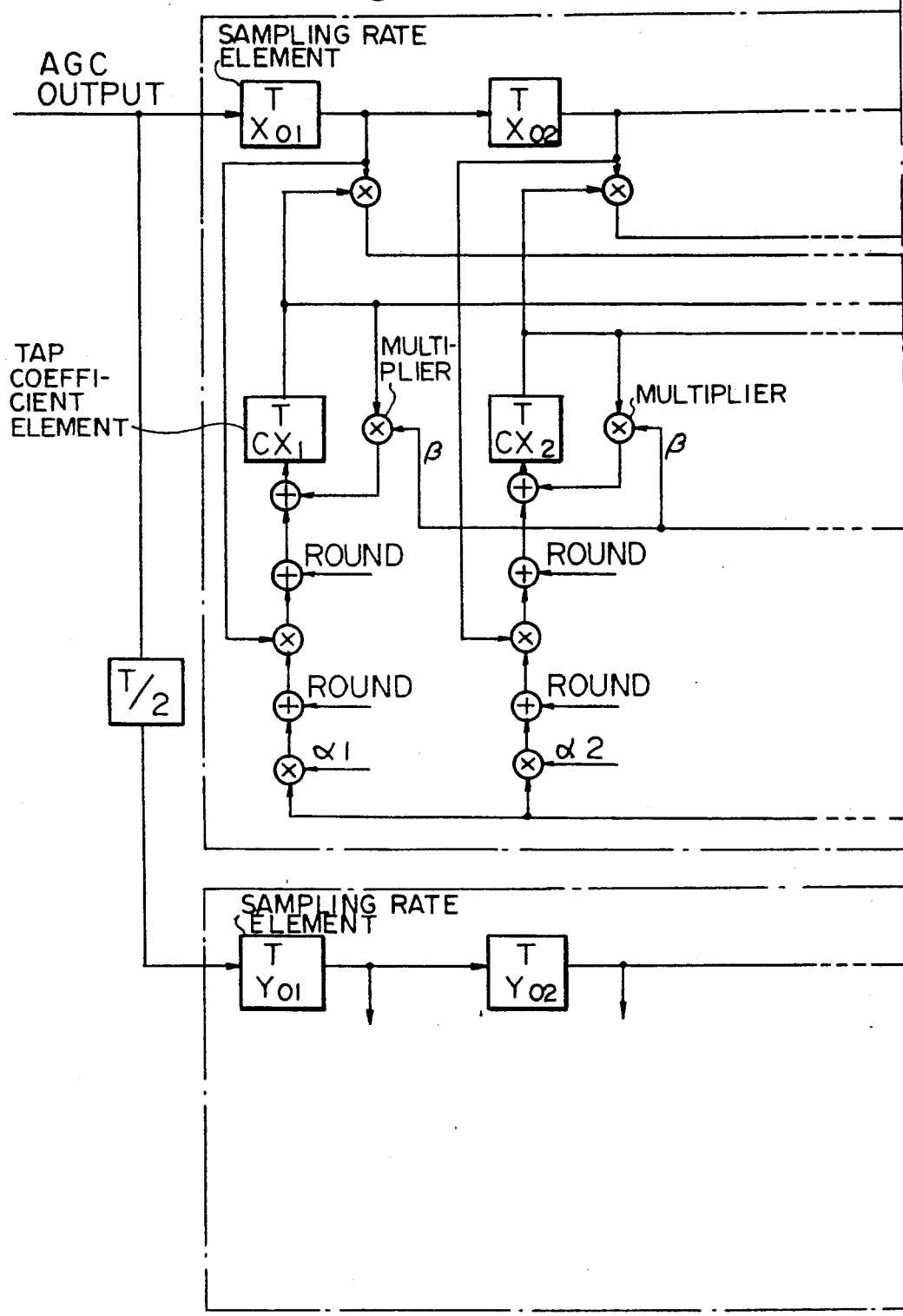
FIGS. 6A & 6B show an example of the structure of the fractionally tap spaced equalizer for the system of FIG. 3.
Figure 6B:
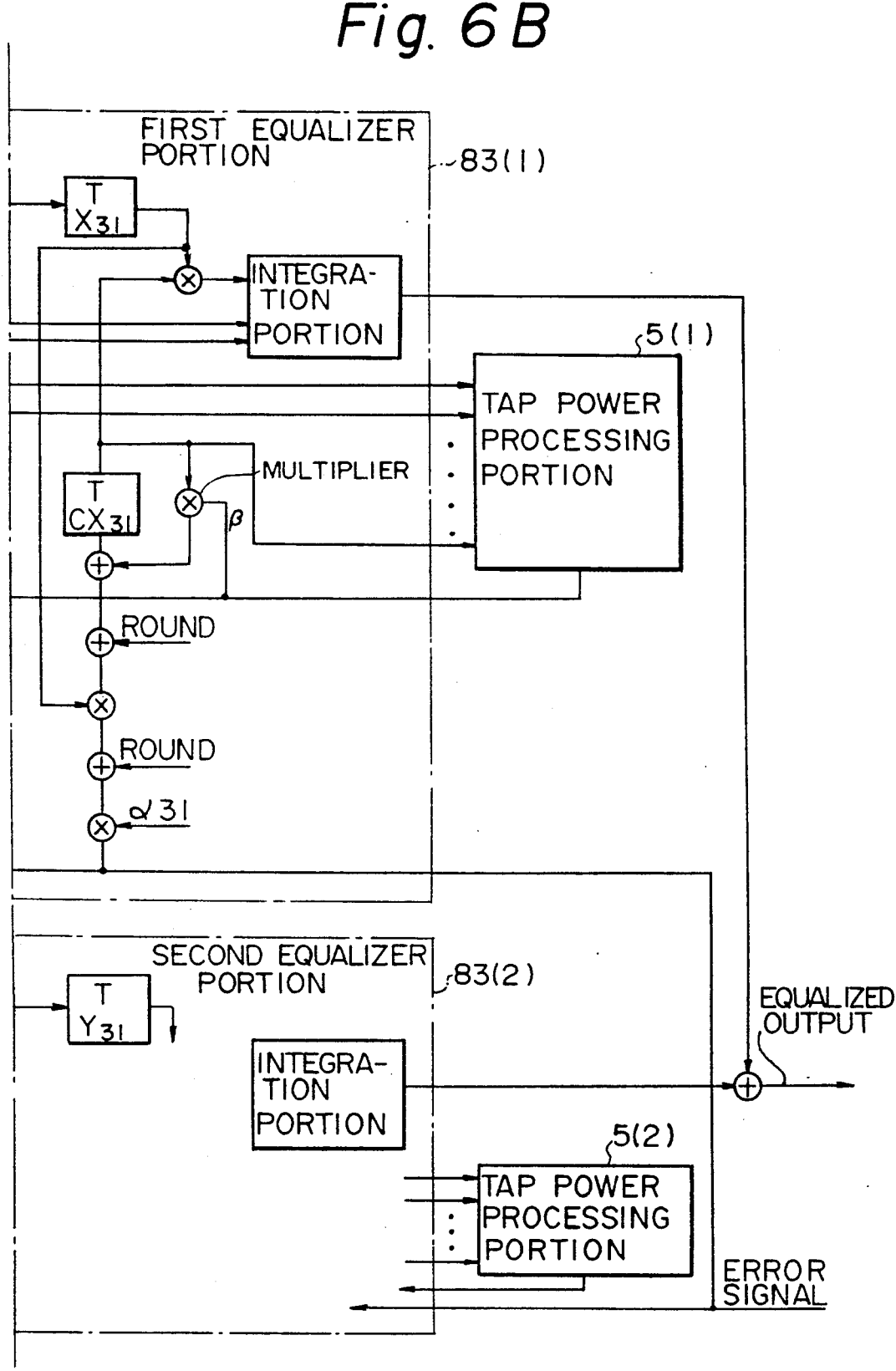

An example of the FSE to which the tap coefficient monitor and control circuit of FIG. 5 is to be applied is shown in FIG. 6. The FSE of FIG. 6 is a double sampling automatic equalizer with the tap interval $T'=T/2$.

The FSE of FIG. 6 includes a first equalizer portion 83(1), a tap power processing portion 5(1), a second equalizer portion 83(2), and a tap power processing portion 5(2). The output of AGC is supplied to the first equalizer portion 83(1), and the sampling rate for giving the tap interval for the symbol rate T in the first equalizer portion 83(1) is made T which is the same as the symbol rate. The operation of the first equalizer portion 83(1) is substantially the same as that of the usual transversal equalizer. A half-divided output (T/2) of the AGC is supplied to the second equalizer portion 83(2). The second equalizer portion 83(2) is operated as an FSE.

In the tap coefficient monitor and control circuit 84 shown in FIG. 4 and FIG. 5, the sum of the powers for all taps is detected based on the tap coefficients $CX_1$ to $CX_{31}$ of the second equalizer portion 83(2), and is compared with the normal gain to decide whether the sum of the powers is normal or abnormal. When the decision is normal, a multiplication factor $\beta=1$ is applied to each of the tap coefficients $CX_1$ to $CX_{31}$ of the first and second equalizer portions 83(1) and 83(2). When the decision is abnormal, a multiplication factor $\beta$ which is slightly less than unity is applied to each of the tap coefficients $CX_1$ to $CX_{31}$. In practice, the coefficient $\beta$ supplied from the tap coefficient control portion 845 (FIG. 5) is applied to each of the multipliers coupled to the tap coefficient elements in the first equalizer portion 83(1). A similar operation is carried out also in the second equalizer portion 83(2).

In the voice frequency range modem shown in FIG. 4, the calculation of the tap power and the correction of the tap coefficient are carried out for each symbol.

It is possible to carry out the calculation of the powers of all taps and the correction of the tap coefficient during the spare time in the receipt of one symbol, if there are allowances in the processing cycle time of the digital signal processor 8 and in the capacity of a read only memory.

It is, of course, possible to carry out the calculation of the powers of all taps to obtain the coefficient $\beta$ in the receipt of one symbol, and carry out the correction of the tap coefficient based on the coefficient $\beta$ in the receipt of the subsequent one symbol.

In the implementation of the system of FIG. 3, it is preferable to take into consideration that there is a limitation resulting from the processing capacity of the digital signal processor 8 (FIG. 4), as described below, for example, with reference to a modem of 9.6 Kbps.

For the coefficient $\beta$ used in the abnormal decision for reducing the tap coefficient, conditions are required as follows. First, the tap coefficient is affected by the phase of timing of the modem, the phase of the carrier signal, and the transmission line; second, the tap coefficient must necessarily be reduced by the application of the coefficient $\beta$; and, third, since too much reduction of the coefficient $\beta$ will adversely affect the S/N error rate, it is desirable to keep the deterioration of the S/N error rate at least not more than 0.1 dB.

The considerations of the influence on the S/N error rate will be described as follows. It is assumed that S/N error rate of 9.6 Kbps is approximately 22 dB, and a 0.1 dB deteriorated S/N is $\gamma$, the $\gamma$ is calculated as follows.

$$10^{\frac{-22}{10}} = 10^{\frac{-22.1}{10}} + 10^{\frac{\gamma}{10}}$$

$$\gamma = 38.43$$

The coefficient $\beta$ is calculated as follows.

$$\begin{aligned} -\gamma &= -38.43 \\ &= 20\log(1-\beta) \\ \beta &= 0.9889157 \text{ (decimal)} \\ &= 3F3B \text{ (hexadecimal)} \end{aligned}$$

Here, in expressing the value of $\beta$, it is assumed that 1 (decimal) = 4000 (hexadecimal).

From the above described calculation, it is found that the coefficient $\beta$ is required to be more than 0.9880157.

Here, the expression of complement of 2 concerning 16 bits is used, and the processing ability of the digital signal processor is assumed to be from $-2$ to 2.

In accordance with the successive reduction of the value $\beta$, a table for indicating the plus side limit, the minus side limit, and the appreciation whether unsuitable (NG) or suitable (OK) is given as follows.

TABLE

| | (IN HEXADECIMAL SYSTEM) | | |
|---|---|---|---|
| $\beta$ | PLUS SIDE LIMIT | MINUS SIDE LIMIT | APPRECIATION |
| 3FFF | 0010 | C000 | NG |
| 3FFE | 0008 | E000 | NG |
| 3FFC | 0004 | F000 | NG |
| 3FF8 | 0002 | F800 | NG |
| 3FF0 | 0001 | FC00 | OK |
| 3FE0 | 0001 | FE00 | OK |
| 3FC0 | 0001 | FF00 | OK |
| 3F80 | 0001 | FF80 | OK |
| 3F00 | 0001 | FFC0 | NG |

From this table, it is determined that the coefficient $\beta=3FF0$ (hexadecimal) is desirable. For this coefficient $\beta$, since S/N deterioration is 60.2 dB, the S/N error rate E is calculated as follows.

$$10^{\frac{-E}{10}} = 10^{\frac{-22}{10}} - 10^{\frac{-60.2}{10}}$$

$$E = 22.00131486$$

Then, the deterioration of S/N error rate is calculated to be 0.0013 dB which enables confirmation that there is no problem in practice.

We claim:

1. A system of a transversal type automatic equalizer having tap coefficients with tap coefficient protection in which inter-symbol interference is prevented, said system comprising:

tap power detecting means for monitoring the tap coefficients and detecting a tap power of each of said tap coefficients;

summing means for summing the tap power of each of said tap coefficients detected by said tap power detecting means producing a sum; and determination means for comparing the sum produced by said summing means with a predetermined threshold value, and for producing a first output determination of normal when the sum is not more than the predetermined threshold value indicating that the tap coefficients not be changed and producing a second output determination of abnormal tap coefficient growth when the sum is more than the predetermined threshold value indicating that the tap coefficients be changed.

2. A system according to claim 1,
wherein said transversal type automatic equalizer includes a gain,
wherein the tap coefficients include values, and
wherein the system further comprising tap control means for controlling the tap coefficients and maintaining the values of the tap coefficients when the first output determination of normal is produced by said determination means, and controlling by multiplying each of the tap coefficients by a predetermined multiplication coefficient which is a little less than unity or by directing to an original point when the second output determination of abnormal tap coefficient growth is produced by said determination means, thereby suppressing the gain of the transversal type automatic equalizer.

3. A system according to claim 2, wherein said predetermined multiplication coefficient is assigned a value which is a little less than unity and able to maintain the deterioration of signal-to-noise error rate at least less than 0.1 dB.

4. A system according to claim 1, wherein the transversal type automatic equalizer operates at a sampling rate less than a symbol rate.

5. A system according to claim 1, wherein the transversal type automatic equalizer indicates a gain assigned as said predetermined threshold value.

6. A system according to claim 1,
wherein the transversal type automatic equalizer includes a usual gain; and
wherein a value more than the usual gain of the transversal type automatic equalizer is assigned as said predetermined threshold value.

* * * * *